(12) United States Patent
Champion et al.

(10) Patent No.: US 11,029,512 B2
(45) Date of Patent: Jun. 8, 2021

(54) ADJUSTING A RESONANT FREQUENCY OF A SCANNING MIRROR

(71) Applicant: Microsoft Technology Licensing, LLC, Redmond, WA (US)

(72) Inventors: Mark Alan Champion, Kenmore, WA (US); Utku Baran, Seattle, WA (US); Joshua Owen Miller, Woodinville, WA (US); Wyatt Owen Davis, Bothell, WA (US); Gregory Theodore Gibson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/020,550

(22) Filed: Jun. 27, 2018

(65) Prior Publication Data

US 2020/0004011 A1    Jan. 2, 2020

(51) Int. Cl.
*G02B 26/10* (2006.01)
*G02B 27/09* (2006.01)
*G09G 3/02* (2006.01)
*H04N 3/08* (2006.01)

(52) U.S. Cl.
CPC ....... *G02B 26/105* (2013.01); *G02B 27/0977* (2013.01); *G09G 3/02* (2013.01); *H04N 3/08* (2013.01)

(58) Field of Classification Search
CPC ............. G02B 26/105; G02B 27/0977; G02B 26/101; G02B 26/0833; G09G 3/02; H04N 3/08
See application file for complete search history.

(56) References Cited

U.S. PATENT DOCUMENTS

| | | | |
|---|---|---|---|
| 6,653,621 B2 | 11/2003 | Wine et al. | |
| 6,791,235 B2* | 9/2004 | Miller | B81C 1/00968 310/309 |
| 2003/0161020 A1* | 8/2003 | Wine | G02B 26/0858 359/212.2 |
| 2004/0119004 A1* | 6/2004 | Wine | G02B 26/101 250/234 |
| 2005/0078169 A1 | 4/2005 | Turner | |
| 2008/0304124 A1 | 12/2008 | Yoda | |
| 2009/0316116 A1* | 12/2009 | Melville | A61B 1/07 353/31 |

(Continued)

OTHER PUBLICATIONS

"International Search Report and Written Opinion Issued in PCT Application No. PCT/US2019/035165", dated Aug. 27, 2019, 14 Pages.

Primary Examiner — John W Miller
Assistant Examiner — Humam M Satti
(74) Attorney, Agent, or Firm — Alleman Hall Creasman & Tuttle LLP (57) ABSTRACT

Examples are disclosed that relate to scanning display systems. One example provides a display device comprising a controller, a light source, and a scanning mirror system. The scanning mirror system comprises a scanning mirror configured to scan light from the light source in at least one direction at a resonant frequency of the scanning mirror, and an electromechanical actuator system coupled with the scanning mirror and being controllable by the controller to adjust the resonant frequency of the scanning mirror.

15 Claims, 7 Drawing Sheets

(56) References Cited

U.S. PATENT DOCUMENTS

| | | | |
|---|---|---|---|
| 2011/0001888 A1* | 1/2011 | Brown | G03B 21/28 |
| | | | 348/744 |
| 2011/0019256 A1* | 1/2011 | Miyagawa | G02B 26/085 |
| | | | 359/213.1 |
| 2011/0267361 A1* | 11/2011 | Kurozuka | G09G 3/02 |
| | | | 345/531 |
| 2011/0292480 A1 | 12/2011 | Ma et al. | |
| 2012/0236379 A1* | 9/2012 | da Silva | G02B 26/101 |
| | | | 359/200.8 |
| 2013/0063799 A1* | 3/2013 | Honda | B81B 3/0032 |
| | | | 359/200.7 |
| 2013/0120225 A1 | 5/2013 | Hanada | |
| 2015/0022871 A1* | 1/2015 | Naono | G02B 26/0858 |
| | | | 359/221.3 |
| 2018/0157031 A1* | 6/2018 | Ogata | B81B 3/0062 |
| 2018/0172994 A1* | 6/2018 | Robbins | G02B 26/0833 |

* cited by examiner

ADJUSTING A RESONANT FREQUENCY OF A SCANNING MIRROR

BACKGROUND

In a scanning display system, light from a light source may be scanned in one or more directions via a controllable mirror to produce a viewable image.

SUMMARY

Examples are disclosed that relate to scanning display systems. One example provides a display device comprising a controller, a light source, and a scanning mirror system. The scanning mirror system comprises a scanning mirror configured to scan light from the light source in at least one direction at a resonant frequency of the scanning mirror, and also comprises an electromechanical actuator system coupled with the scanning mirror and being controllable by the controller to adjust the resonant frequency of the scanning mirror.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Some scanning display systems may scan light from a light source in a first direction at a slower rate and a second direction at a faster rate to raster scan an image for display. In some examples, separate mirrors may be used for the different scan directions, while in other examples a same mirror may be used to scan in both directions. Various types of scanning mirrors may be used, including but not limited to microelectromechanical system (MEMS) mirrors.

Video data may have an associated line rate at which pixels are to be displayed in a horizontal direction, and a refresh or frame rate at which whole images or frames are to be displayed in a vertical direction. To achieve relatively fast line rates (e.g., greater than 20 kHz) for high resolution image display, a MEMS-based scanning mirror may be driven at its resonant frequency. To facilitate image display, such a mirror may be designed to have a resonant frequency that is a multiple (e.g. 400) of a desired frame rate so that scanning of each new image data frame begins at a consistent pixel location. However, as the resonant frequency is a function of the structure of the mirror (e.g. shape, mass, etc.), the actual harmonic frequency of a MEMS-based mirror may be somewhat different than the target harmonic frequency for which them mirror was designed, for example, due to manufacturing variances and to usage over time. This may lead to variances in the location at which scanning starts between frames, as the oscillating frequency of the mirror may not be an exact multiple of the frame rate. Further, different video data may have differing frame rates. A data buffer may be used as one possible mitigation strategy for such issues. However, this may add cost, complexity, and display latency, which may make this strategy untenable for display contexts where low display latency is desirable, such as in virtual or mixed reality head-mounted displays. Other mechanisms for compensating, such as a frame locking mechanism, may introduce similar undesirable issues.

Thus, examples are disclosed that relate to adjusting the resonant frequency of a scanning mirror in a display device to allow a harmonically oscillating scanning mirror to be synchronized with a video data frame rate. As described in more detail below, the disclosed examples may allow a display device to dynamically adapt operation to compensate for manufacturing variances in resonant frequency, variances in video data, and/or to adjust to changes in resonant frequency that may occur over time due to factors such as ageing, temperature, etc. In this way, proper frame display may be achieved without the inclusion of large buffers and/or frame locking mechanisms.

Figure 1:
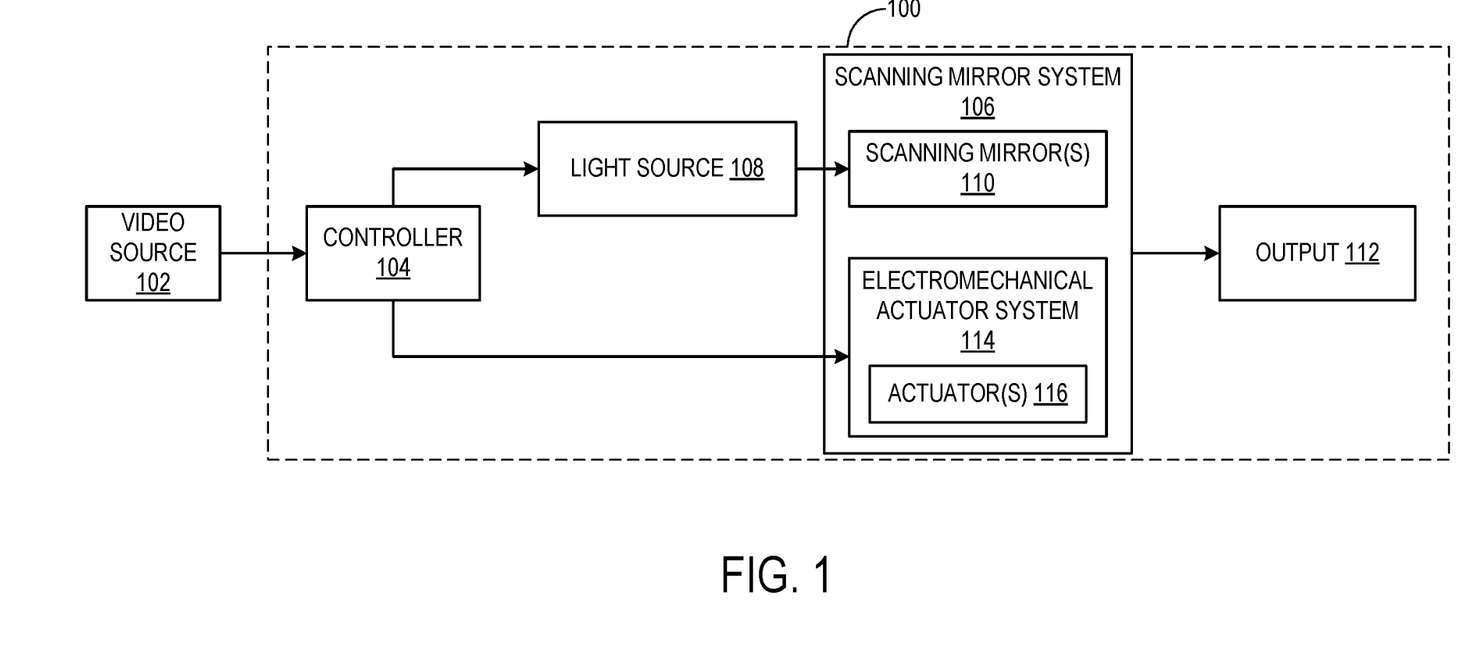
FIG. 1 schematically shows an example display device.

FIG. 1 schematically shows an example display device 100 in communication with a video source 102. Display device 100 includes a controller 104 operatively coupled to a scanning mirror system 106 and to a light source 108. Controller 104 is configured to control light source 108 to emit light based on video image data received from video source 102. Light source 108 may include any suitable light-emitting elements, such as one or more lasers. Light source 108 may output light in any suitable wavelength ranges—e.g., red, green, and blue wavelength ranges that enable the production of color images. In other examples, light source 108 may output substantially monochromatic light.

Scanning mirror system 106 comprises one or more scanning mirrors 110 controllable to vary an angle at which light from the light source is reflected to thereby scan an image. As mentioned above, scanning mirror system 106 may include a single mirror configured to scan light in horizontal and vertical directions, or separate mirrors for scanning in the horizontal and vertical directions. In other examples, scanning mirror system 106 may scan light in any other suitable manner via any suitable number of mirrors.

Light reflected by scanning mirror system 106 is directed toward an output 112 for display of a scanned image. Output 112 may take any suitable form, such as projection optics, waveguide optics, etc. Display device 100 may be configured as a virtual reality head-mounted display (HMD) device, mixed reality HMD device, or any other suitable display device, such as a head-up display, mobile device screen, monitor, television, etc.

As mentioned above, scanning mirror system 106 may be configured to scan light in a horizontal direction via harmonic oscillation of a MEMS mirror. However, due to manufacturing tolerances and use-based factors, the actual resonant frequency of a MEMS-based scanning mirror may vary from a target scan rate. Accordingly, scanning mirror system 106 comprises an electromechanical actuator system 114 comprising one or more actuators 116 controllable to adjust the resonant frequency to synchronize the horizontal scan rate of scanning mirror(s) 110 to the line rate of received video. As described in more detail below, electromechanical actuator system 114 may be configured to change a tension in supports (flexures) that support the harmonically oscillating mirror 110, and/or change a distribution of mass in the mirror, to thereby adjust the resonant frequency at which the mirror oscillates.

Figure 2:
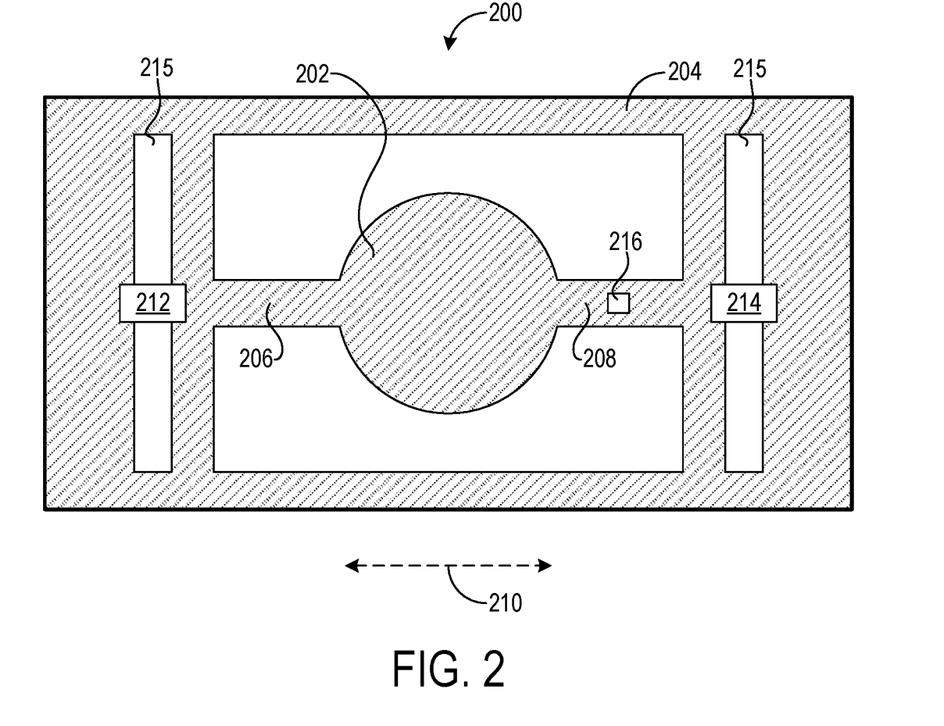
FIG. 2 shows an example scanning mirror system including a first example electromechanical actuator system.

FIG. 2 shows an example scanning mirror system 200 comprising a first example electromechanical actuator. Scanning mirror system 200 includes a MEMS mirror 202 attached to a frame 204 via a first flexure 206 and a second flexure 208. First and second flexures 206 and 208 may provide respective pivots via which mirror 202 can rotate and thereby change its angular orientation to vary the angle at which light from a light source is reflected. Mirror 202 may scan in a horizontal or vertical direction, depending upon an orientation in which scanning mirror system 200 is incorporated into a display device.

Scanning mirror system 200 further includes an electromechanical actuator system comprising a first actuator 212 coupled to frame 204 adjacent to first flexure 206, and a second actuator 214 coupled to the frame adjacent to second flexure 208. First and second actuators 212 and 214 are actuatable to adjust respective tensions in first and second flexures 206 and 208 in response to electrical signals. In the example depicted in FIG. 2, actuators 212 and 214 span respective gaps 215 in frame 204. Actuators 212 and 214 may apply respective forces across the gaps 215 that may be varied to adjust the tensions in flexures 206 and 208, and thereby adjust the resonant frequency of mirror 202. For example, upon receiving an electrical signal having a first polarity (e.g., positive), actuators 212 and 214 may apply a contractive force across gaps 215, thereby increasing the tensions in flexures 206 and 208 and the resonant frequency of mirror 202. An electrical signal having a second, different polarity (e.g., negative) may cause actuators 212 and 214 to apply a dilative force across gaps 215, thereby decreasing the tensions in flexures 206 and 208 and the resonant frequency of mirror 202. Further, the magnitude of force applied by actuators 212 and 214 to flexures 206 and 208—and thus the magnitude of adjustment to the resonant frequency of mirror 202—may be controlled by controlling the magnitude of an electrical signal applied to the actuators.

A controller (e.g., controller 104 of FIG. 1) may generate control signals for controlling the electromechanical actuator system of mirror system 200 to adjust the resonant frequency of mirror 202. To allow the controller to achieve and maintain a desired resonant frequency, the scanning mirror system 200 may comprise a feedback device 216 configured to sense the mirror motion (e.g. by sensing strain in flexure 208). Feedback device 216 may provide positive output in response to torsion of flexure 208 in a first direction, and negative output in response to torsion of the flexure in a second, opposite direction, wherein the degree of mirror motion may be indicated by the magnitude of the output signal from feedback device 216. While the depicted example shows a single feedback device 216 arranged on flexure 208, any other suitable number and arrangement of feedback devices may be used. Moreover, while described above as sensing strain, any other suitable sensor than a strain gauge may be used in other examples.

Figure 3:
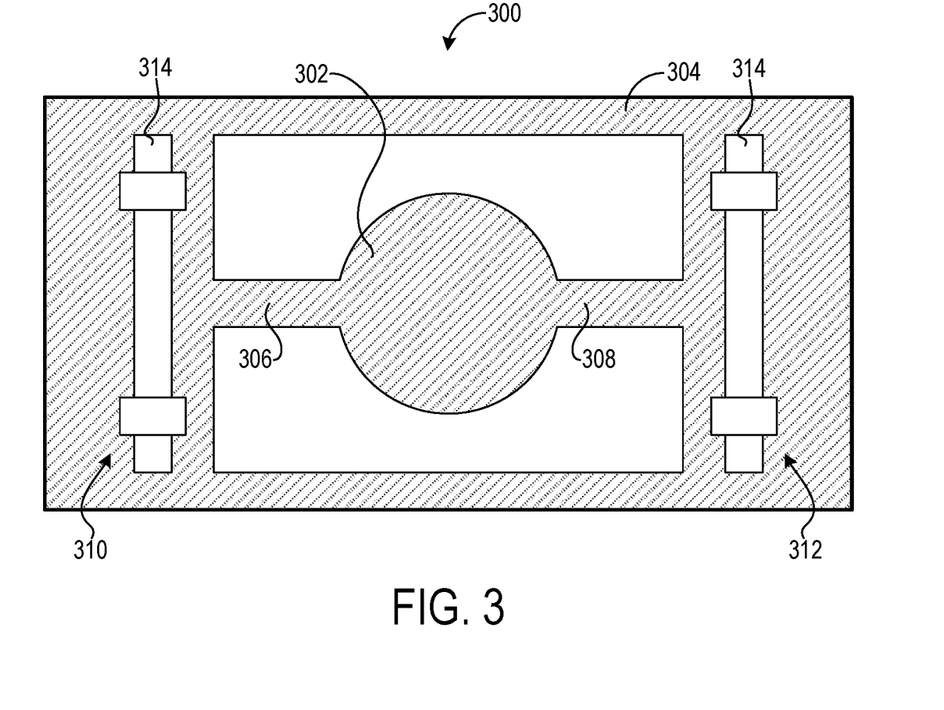
FIG. 3 shows a second example electromechanical actuator system.

FIG. 3 shows another example scanning mirror system 300 comprising an electromechanical actuator system configured to adjust a resonant frequency of the scanning mirror system. Scanning mirror system 300 comprises a scanning mirror 302 coupled to a frame 304 via first and second flexures 306 and 308. In this example, the electromechanical actuator system includes a first actuator pair 310 coupled to frame 304 adjacent to first flexure 306, and a second actuator pair 312 coupled to the frame adjacent to second flexure 308. Each actuator of actuator pairs 310 and 312 spans respective gaps 314 in frame 304. The spacing of individual actuators away from flexures 306 and 308 on each side of flexures 306 and 308 may provide mechanical advantage, thereby enabling a greater range within which the flexure tensions and resonant frequency of mirror 302 can be adjusted.

The electromechanical actuator system of mirror systems 200 and 300 may utilize any suitable type of actuators. In some examples, each actuator may comprise a piezoelectric material that changes dimension based upon an applied voltage. In other examples, each actuator may comprise magnetic actuators, wherein a magnetic force between magnetic elements can be varied via electrical signal. In yet other examples, each actuator may comprise an electrostatic actuator, where an electric field between electrodes can be varied to adjust flexure tensions. As a further example, each electromechanical actuator may utilize one or more bimetallic strips, where differing coefficients of thermal expansion of different materials can be leveraged to vary the flexure tensions. Further, actuator(s) of an electromechanical actuator system may be arranged at any suitable location in a scanning mirror system. In some examples, frames 204 and 304 may be formed from micromachined silicon dies, and electromechanical actuators may be positioned on the same die surface as mirror 202 or 302, or on an opposing die surface.

Figure 4A:
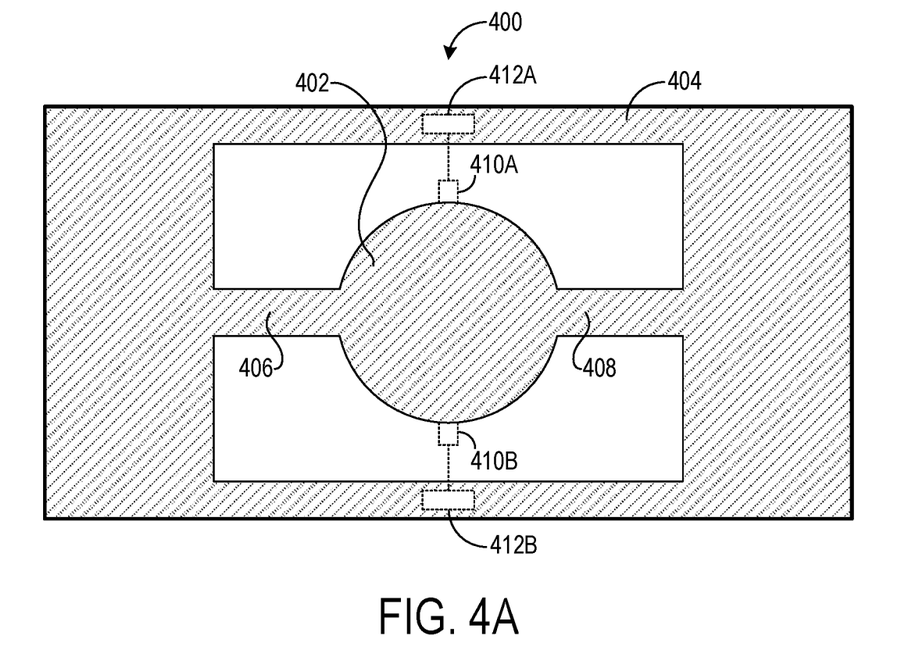
FIGS. 4A-4B show a third example electromechanical actuator system.
Figure 4B:
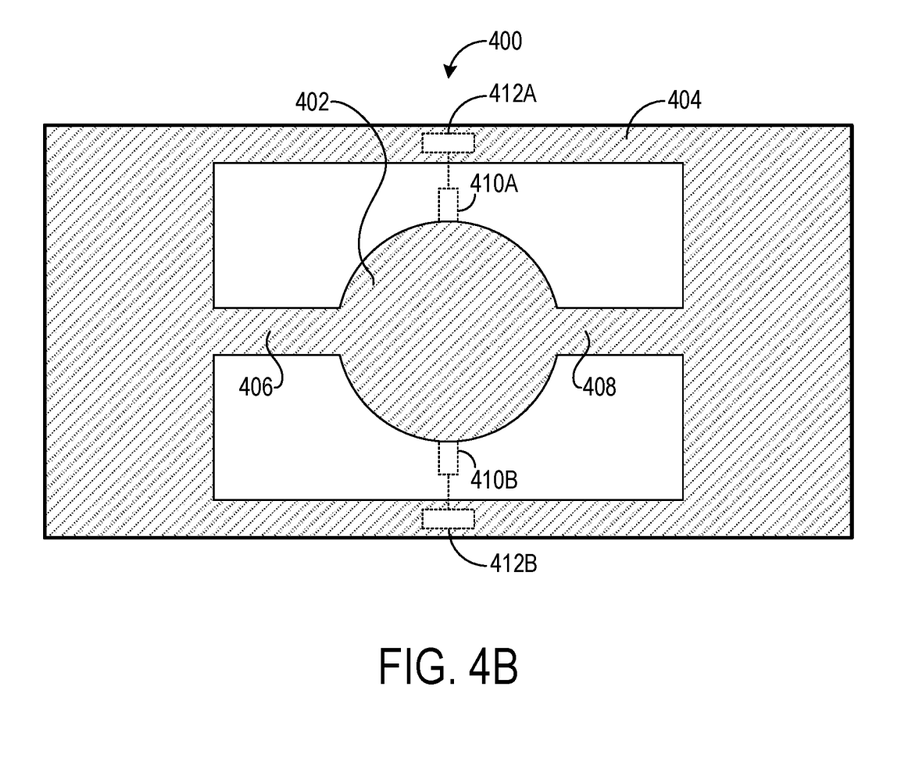

In the above examples, a resonant frequency of a scanning mirror is adjusted by changing a tension in flexures supporting the mirror. In other examples, the resonant frequency may be adjusted by moving a mass coupled to the scanning mirror. FIGS. 4A-4B show an example scanning mirror system 400 including a mirror 402 coupled to a frame 404 via first and second flexures 406 and 408, and also including one or more movable masses 410A, 410B coupled to scanning mirror 402. Masses 410 may be of substantially equal mass and arranged on opposite sides of flexures 406 and 408 in a balanced configuration. FIG. 4A schematically shows a first state of mirror system 400 in which movable masses 410 are arranged in first respective positions (e.g. orientation and/or relative location) relative to mirror 402, while FIG. 4B shows a second state of the mirror system in which movable masses 410A, 410B are arranged at second respective positions relative to the mirror. In the second positions, movable masses 410A, 410B are moved farther away from an oscillation axis of the mirror relative to the mass distribution in the first position. Moving mass away from the oscillation axis may decrease the resonant frequency, while moving mass closer to the oscillation axis may increase the resonant frequency. In some examples, a spring arm may couple movable masses 410 to mirror 402 (or another suitable location in mirror system 400), enabling adjustment of the relative position of the movable masses and thus the resonant frequency of the mirror with suitable respective actuators 412A, 412B. Actuators 412 may assume any suitable form. For example, the masses coupled to mirror 402 may comprise a magnetic material, and actuators 412 may comprise an electromagnet configured for magnetic actuation of the masses. In other examples, actuators 412 may attract moveable masses 410 with electrostatic force. While FIG. 4B depicts movement of both moveable masses 410A, 410B, in other examples a single moveable mass may undergo actuation to adjust the resonant frequency of mirror 402. Further, while shown as comprising two movable masses coupled to mirror 402, any suitable implementation of a movable mass-based electromechanical actuator system is possible, which may include any other suitable number of movable mass(es) and/or coupling of movable mass(es) to other locations in mirror system 400.

Figure 5:
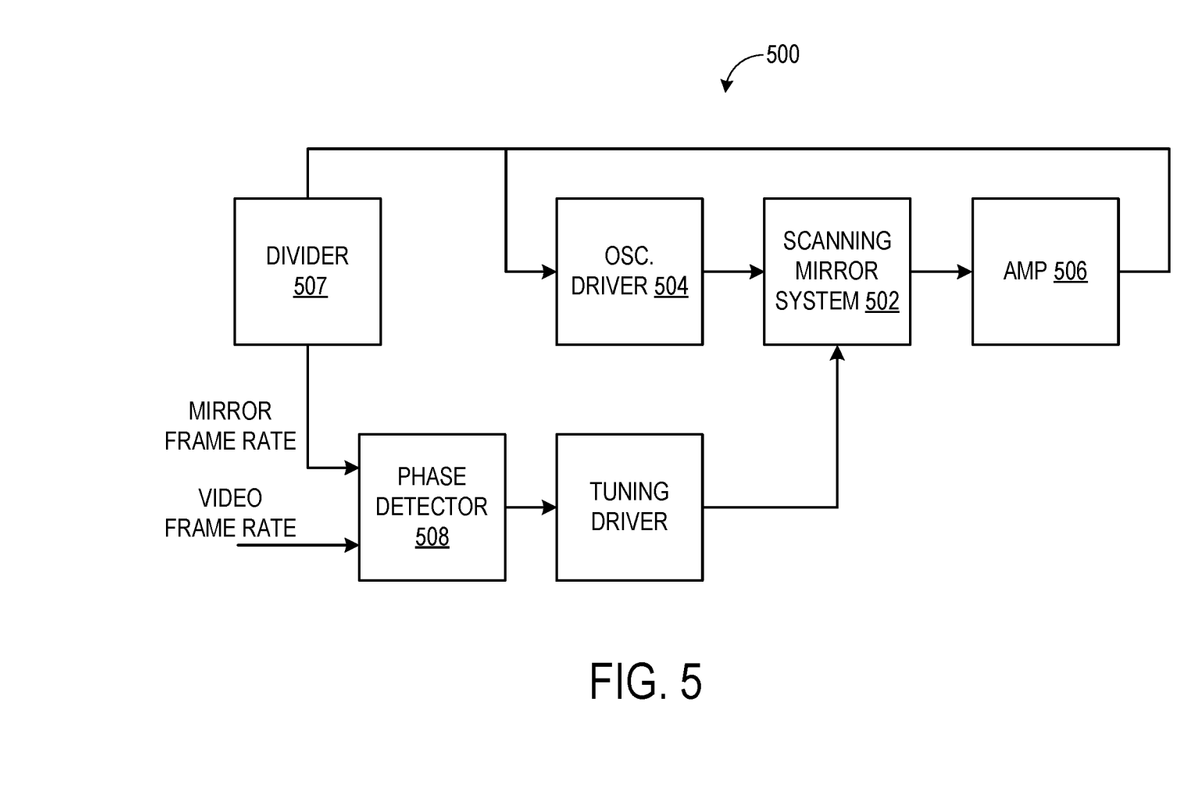
FIG. 5 schematically shows an example circuit for adjusting the resonant frequency of a scanning mirror in a scanning mirror system.

FIG. 5 schematically shows an example circuit 500 for adjusting the resonant frequency of a scanning mirror in a scanning mirror system. Circuit 500 may be used to adjust the resonant frequency of the mirrors in mirror systems 110, 200, 300, and/or 400, for example. Circuit 500 may be at least partially implemented in controller 104 of FIG. 1, for example.

Circuit 500 interfaces with a scanning mirror system 502 that includes a scanning mirror having a resonant frequency at which the scanning mirror is driven by an oscillator driver 504. Mirror system 502 outputs a signal indicative of the resonant frequency of the mirror, which is amplified by an amplifier 506 and fed back into oscillator driver 504.

The amplified feedback signal indicating the resonant frequency of the scanning mirror of scanning mirror system 502 is received by a divider 507, which divides the resonant frequency by an integer (e.g., a number of horizontal lines in images scanned by mirror system 502), thereby producing a signal indicating a frame rate or vertical scan rate of the mirror system. This mirror frame rate is received by a phase detector 508, which also receives a signal indicative of the frame rate of video image data being displayed. Detector 508 compares the mirror frame rate with the video frame rate, and in response generates a signal that is fed to a tuning driver 510 to thereby generate a control signal for controlling an electromechanical actuator system of the scanning mirror system 502. The control signal may cause the electromechanical actuator to adjust the resonant frequency of the scanning mirror of scanning mirror system 502 such that the vertical scan rate of the mirror is synchronized with the frame rate of the video image data. In some examples, the control signal may cause the horizontal scan rate of the mirror to be synchronized with a line rate of the video image data. In other examples, a vertical scanning mirror, or other suitable scanning mirror, may be adjusted.

Figure 6:
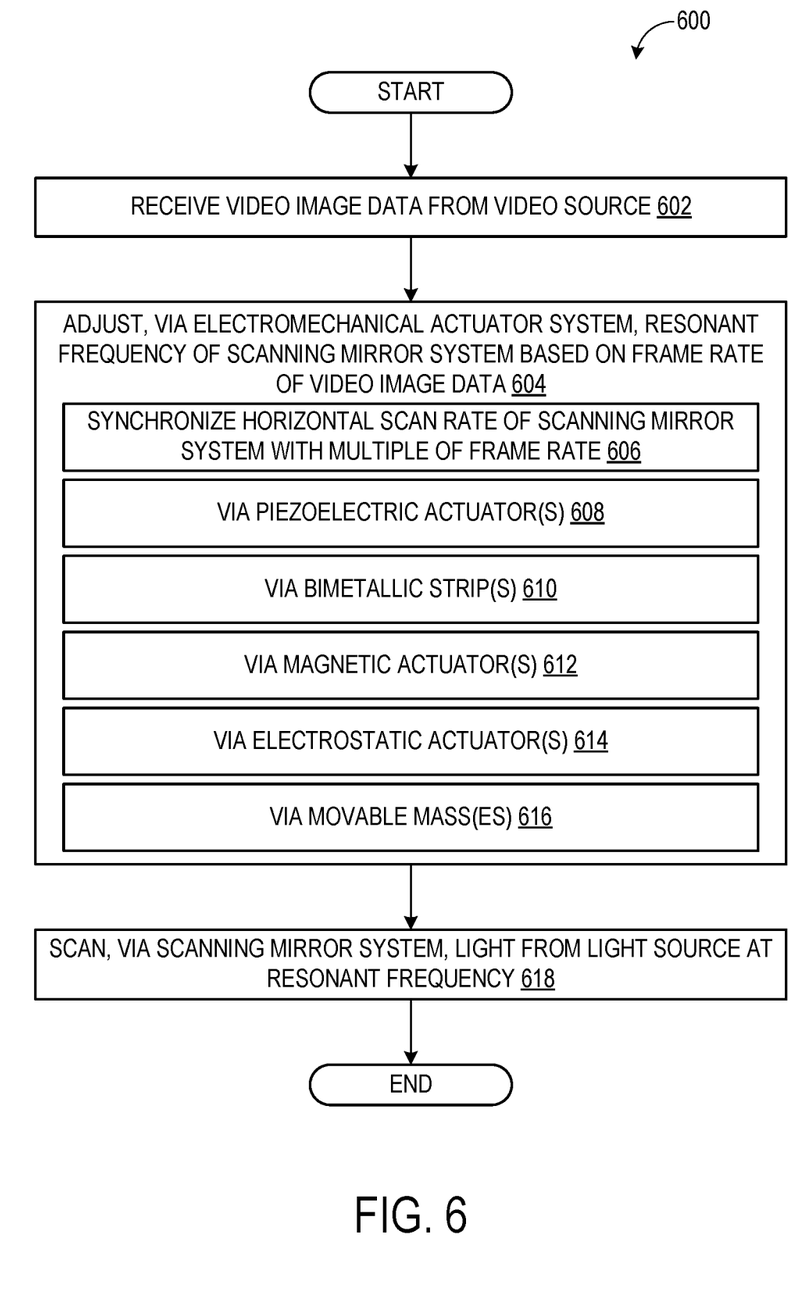
FIG. 6 shows a flowchart illustrating an example method of adjusting the resonant frequency of a scanning mirror in a scanning mirror system.

FIG. 6 shows a flowchart illustrating a method 600 of adjusting the resonant frequency of a scanning mirror in a scanning display device. At 602, method 600 includes receiving video image data from a video source. At 604, method 600 includes adjusting, via an electromechanical actuator system coupled with the scanning mirror, a resonant frequency of the scanning mirror based on a frame rate of the video image data. As indicated at 606, in some examples adjusting the resonant frequency may include synchronizing a horizontal scan rate of the scanning mirror with a multiple of the frame rate (e.g., the line rate of the video image data). In some examples, the scanning mirror may include a mirror attached to a frame via a first flexure and a second flexure, and adjusting the resonant frequency may include adjusting tensions of the first and second flexures. In such examples, as the resonant frequency may be adjusted via one or more piezoelectric actuators 608, via one or more bimetallic strips 610, via one or more magnetic actuators 612, and/or via one or more electrostatic actuators 614. Alternatively or additionally, as indicated at 616, the resonant frequency may be adjusted by redistributing a mass of the mirror via one or more movable masses.

Figure 7A:
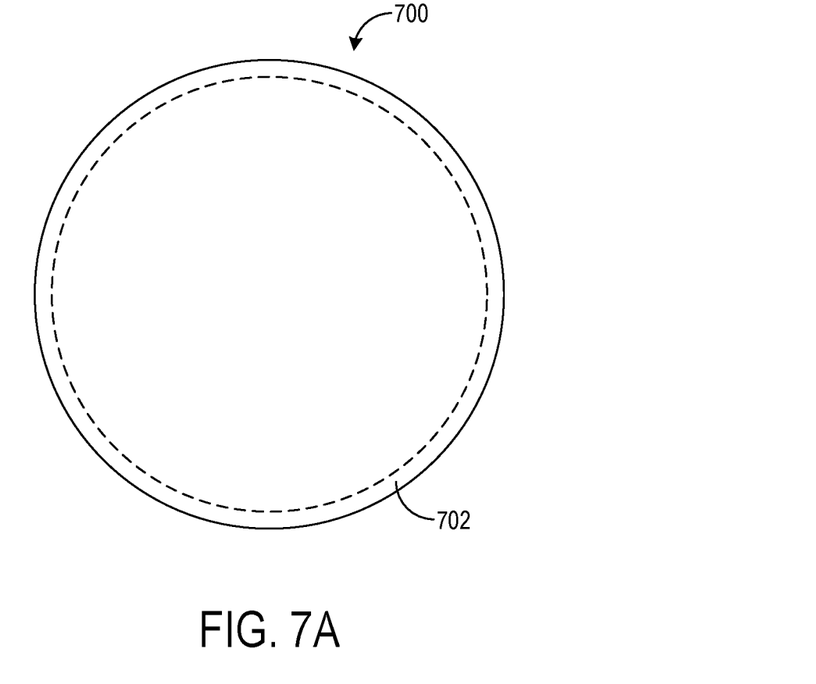
FIGS. 7A-7B show an example of adjusting the mass of a scanning mirror during manufacturing to adjust the resonant frequency of the scanning mirror.

As mentioned above, variances in manufacturing scanning mirrors for scanning mirror systems may result in mirrors having resonant frequencies that are slightly off a target resonant frequency. Thus, a process for manufacturing scanning mirrors may account for such variance by providing for the adjustment of the resonant frequency of a mirror during manufacture. For example, FIG. 7A shows a scanning mirror 700 formed with an initial mass corresponding to an initial resonant frequency. As the initial resonant frequency of mirrors formed via the manufacturing process may differ from a desired target resonant frequency, mirror 700 is formed with one or more sacrificial regions 702 configured as an area where a portion of mirror mass may be removed to adjust the resonant frequency to a target resonant frequency corresponding to the reduced mass. Sacrificial region 702 is shown as occupying a perimeter of mirror 700, but may be arranged at any other suitable location in the mirror.

Figure 7B:
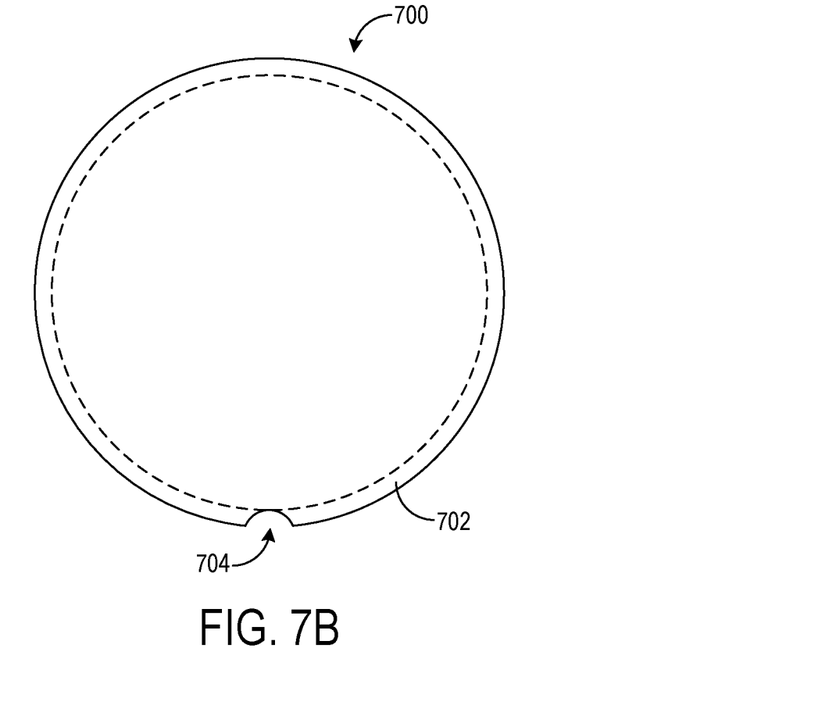

The resonant frequency of the mirror may be initially measured, e.g. via a strain gauge or other suitable gauge, to determine a resonant frequency of the mirror. If the resonant frequency differs from the target resonant frequency, then an amount of, and location of, mass to be removed to achieve the target resonant frequency may be determined. In the example depicted in FIG. 7B, the measured resonant frequency of mirror 700 is less than the target resonant frequency, and a computed portion of mass is removed from sacrificial region 702 in the form of a notch 704. The resonant frequency again may be measured. In other examples, the measured resonant frequency of mirror 700 may be greater than the target resonant frequency, and a computed portion of mass may be added to the mirror in region 702 or another suitable location. Any suitable method of increasing or reducing the mass of mirror 700 may be used, including but not limited to material deposition or laser ablation. In this manner, mass may be added or removed until the target resonant frequency is reached or within a desired range.

Figure 8:
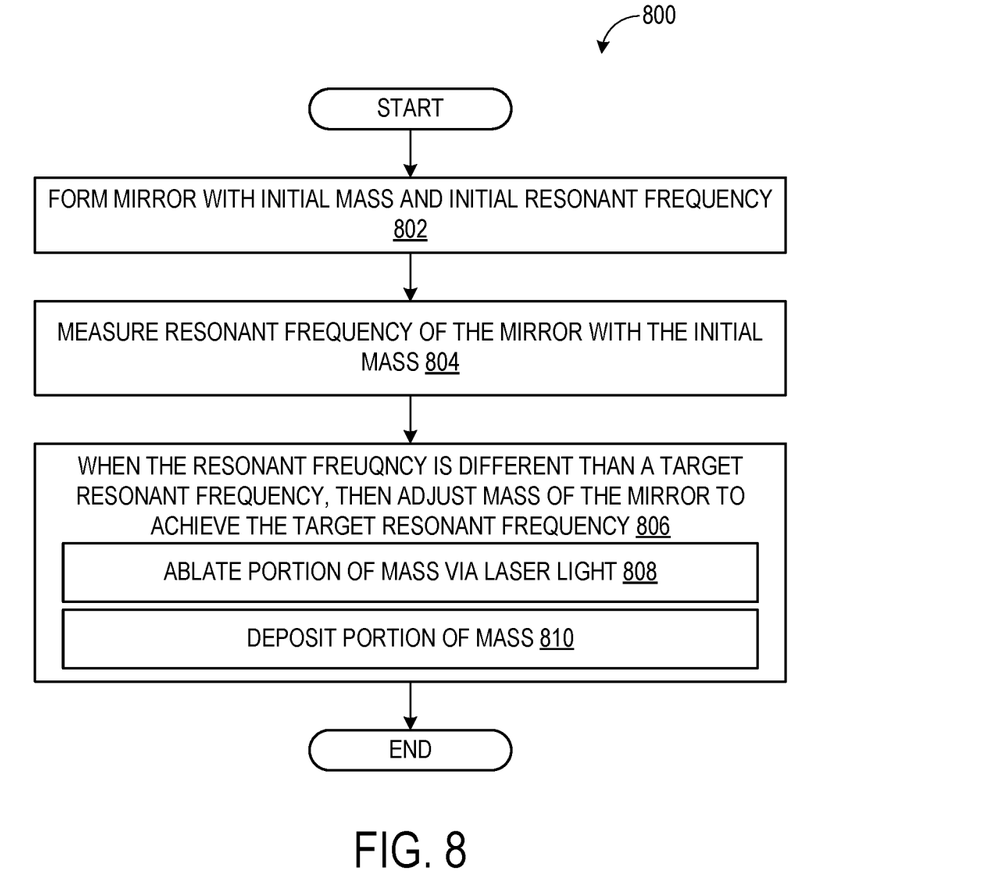
FIG. 8 shows a flowchart illustrating an example method of manufacturing a scanning display system.

FIG. 8 shows a flowchart illustrating a method 800 of manufacturing a scanning display system. At 802, method 800 includes forming a mirror having an initial mass and having an initial resonant frequency. Any suitable method of forming the mirror may be used, such as suitable photolithographic processes. At 804, method 800 includes measuring the resonant frequency. At 806, method 800 includes, when the resonant frequency is different than a target resonant frequency, then adjusting a mass of the mirror from the initial mass to an adjusted mass to achieve the target resonant frequency. Adjusting the mass of the mirror may include reducing the mass 808 by ablating a portion of the mass via a laser, or increasing the mass 810 by depositing a portion of added mass (e.g., via a suitable lithographic process). In some examples, the resonant frequency may be measured continuously during mass adjustment, while in other examples mass may be adjusted stepwise, with resonant frequency measurements performed between mass adjustment steps, until the target resonant frequency is reached or within a desired range. Since mirror manufacturing techniques, and techniques for adding mass to or removing mass from a mirror, may exhibit some degree of tolerance, "target resonant frequency" as used herein may refer in some examples to a range of target resonant frequencies (e.g., a desired target resonant frequency +/−2 Hz). In these examples, configuring a mirror with a target resonant frequency may including configuring the mirror with a resonant frequency within the range of resonant frequencies referred to by the target resonant frequency.

Another example provides a display device comprising a controller, a light source, and a scanning mirror system comprising a scanning mirror configured to scan light from the light source in at least one direction at a resonant frequency of the scanning mirror, and an electromechanical actuator system coupled with the scanning mirror and being controllable by the controller to adjust the resonant frequency of the scanning mirror. In such an example, the display device alternatively or additionally may comprise an electronic circuit configured to generate a control signal to control the electromechanical actuator system by comparing the resonant frequency to a framerate of video received by the display device. In such an example, the electronic circuit alternatively or additionally may be configured to synchronize a scan rate of the scanning mirror with a multiple of a framerate of video received by the display device. In such an example, the scan rate may be a horizontal scan rate. In such an example, the scanning mirror may comprise a mirror attached to a frame via a first flexure and a second flexure. In such an example, the electromechanical actuator system may comprise a first actuator coupled to the frame adjacent to the first flexure and a second actuator coupled to the frame adjacent to the second flexure such that actuation of the first actuator and the second actuator adjusts tensions of the first flexure and the second flexure. In such an example, the first actuator and the second actuator alternatively or additionally may span respective gaps in the frame. In such an example, the electromechanical actuator system alternatively or additionally may comprise a first actuator pair coupled to the frame adjacent to the first flexure and a second actuator pair coupled to the frame adjacent to the second flexure. In such an example, the electromechanical actuator system alternatively or additionally may comprise a piezoelectric actuator. In such an example, the electromechanical actuator system alternatively or additionally may comprise a magnetic actuator. In such an example, the electromechanical actuator system alternatively or additionally may comprise an electrostatic actuator. In such an example, the electromechanical actuator system alternatively or additionally may comprise a movable mass coupled with the scanning mirror. In such an example, the electromechanical actuator system alternatively or additionally may comprise a bimetallic strip.

Another example provides, enacted on a scanning display device, a method comprising receiving video image data from a video source, adjusting, via an electromechanical actuator system, a resonant frequency of a scanning mirror coupled with the electromechanical actuator system based on a framerate of the video image data, and scanning, via the scanning mirror, light from a light source at the resonant frequency. In such an example, adjusting the resonant frequency may comprise synchronizing a horizontal scan rate of the scanning mirror with a multiple of the framerate. In such an example, the scanning mirror may comprise a mirror attached to a frame via a first flexure and a second flexure, and adjusting the resonant frequency may comprise adjusting tensions of the first flexure and the second flexure. In such an example, the tensions of the first flexure and the second flexure may be adjusted via a piezoelectric actuator. In such an example, adjusting the resonant frequency alternatively or additionally may comprise adjusting a position of a mass coupled with the scanning mirror.

Another example provides a method of manufacturing a scanning display system comprising forming a mirror with an initial mass corresponding to an initial resonant frequency, determining a resonant frequency of the mirror with the initial mass, and when the resonant frequency is different than a target resonant frequency, then adjusting a mass of the mirror from the initial mass to an adjusted mass such that the mirror has the target resonant frequency. In such an example, adjusting the mass of the mirror may comprise one or more of depositing a portion of added mass via a deposition process and ablating a portion of the mass via laser light.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device, comprising:
control circuitry comprising a tuning driver, a phase detector, and an oscillating driver;
a light source; and
a scanning mirror system comprising
a scanning mirror attached to a frame via a flexure, the scanning mirror configured to be driven by the oscillating driver at a resonant frequency of the scanning mirror and thereby scan light from the light source in at least one direction at the resonant frequency, and
an electromechanical actuator system coupled with the scanning mirror and being controllable by the tuning driver to adjust the resonant frequency of the scanning mirror, the electromechanical actuator system comprising an actuator that spans a corresponding gap, the gap being formed in the frame and spaced away from the flexure, the actuator being configured to apply one or more of a contractive force across the gap to thereby increase a tension in the flexure and increase the resonant frequency of the scanning mirror, and a dilative force across the gap to thereby decrease the tension in the flexure and decrease the resonant frequency of the scanning mirror, wherein the control circuitry is configured to compare via the phase detector a signal indicative of a video frame rate and a signal indicative of the resonant frequency, the comparing by the phase detector being performed after performing an adjustment to permit the comparing of the signal indicative of the video frame rate and the signal indicative of the resonant frequency, and to provide a signal to the tuning driver based on comparing the signal indicative of the video frame rate with the signal indicative of the resonant frequency.

2. The display device of claim 1, wherein the control circuitry is configured to perform the adjustment to permit the comparing of the signal indicative of the video frame rate and the signal indicative of the resonant frequency by dividing the signal indicative of the resonant frequency by a number of lines scanned in the at least one direction per video frame.

3. The display device of claim 2, wherein the at least one direction comprises a horizontal direction.

4. The display device of claim 1, wherein the flexure is a first flexure, and wherein the scanning mirror comprises a mirror attached to the frame via the first flexure and a second flexure.

5. The display device of claim 4, wherein the actuator is a first actuator, wherein the electromechanical actuator system further comprises a second actuator, and wherein the first actuator is coupled to the frame adjacent to the first flexure and the second actuator is coupled to the frame adjacent to the second flexure such that actuation of the first actuator and the second actuator adjusts tensions of the first flexure and the second flexure.

6. The display device of claim 4, wherein the electromechanical actuator system comprises a first actuator pair coupled to the frame adjacent to the first flexure and a second actuator pair coupled to the frame adjacent to the second flexure.

7. The display device of claim 1, wherein the electromechanical actuator system comprises a piezoelectric actuator.

8. The display device of claim 1, wherein the electromechanical actuator system comprises a magnetic actuator.

9. The display device of claim 1, wherein the electromechanical actuator system comprises an electrostatic actuator.

10. The display device of claim 1, wherein the electromechanical actuator system comprises a moveable mass coupled with the scanning mirror.

11. The display device of claim 1, wherein the electromechanical actuator system comprises a bimetallic strip.

12. Enacted on a scanning display device, a method, comprising:
  receiving video image data from a video source;
  adjusting, by controlling an electromechanical actuator system via a tuning driver, a resonant frequency of a scanning mirror coupled with the electromechanical actuator system based on a signal provided to the tuning driver by a phase detector, the signal being determined based on comparing via the phase detector a frame rate of the video image data with a mirror frame rate of the scanning mirror, the mirror frame rate being determined by dividing a signal indicative of the resonant frequency of the scanning mirror by a number of lines scanned in an image by the scanning mirror in a direction, the scanning mirror comprising a mirror attached to a frame via a first flexure and a second flexure, the electromechanical actuator system comprising a first actuator and a second actuator that each span respective gaps formed in the frame and spaced away from the first flexure and the second flexure, the first actuator and the second actuator being configured to apply one or more of a contractive force across the gaps to thereby increase tensions in the first flexure and the second flexure and increase the resonant frequency of the scanning mirror, and a dilative force across the gaps to thereby decrease the tensions in the first flexure and the second flexure and decrease the resonant frequency of the scanning mirror; and
  scanning, by driving the scanning mirror at the resonant frequency via an oscillating driver, light from a light source at the resonant frequency.

13. The method of claim 12, wherein adjusting the resonant frequency comprises synchronizing a horizontal scan rate of the scanning mirror with a multiple of the frame rate of the video image data.

14. The method of claim 12, wherein each of the first actuator and the second actuator comprise a piezoelectric actuator.

15. The method of claim 12, wherein adjusting the resonant frequency comprises adjusting a position of a mass coupled with the scanning mirror.

* * * * *